(12) United States Patent
Chen et al.

(10) Patent No.: US 10,912,279 B2
(45) Date of Patent: Feb. 9, 2021

(54) PET FEEDER

(71) Applicant: Dogness Group LLC, Plano, TX (US)

(72) Inventors: Silong Chen, Dongguan (CN); Yunhao Chen, Plano, TX (US)

( * ) Notice: Subject to any disclaimer, the term of this patent is extended or adjusted under 35 U.S.C. 154(b) by 353 days.

(21) Appl. No.: 16/147,606

(22) Filed: Sep. 29, 2018

(65) Prior Publication Data

US 2020/0100459 A1   Apr. 2, 2020

(51) Int. Cl.
*A01K 5/02* (2006.01)

(52) U.S. Cl.
CPC .......... *A01K 5/0225* (2013.01); *A01K 5/0275* (2013.01)

(58) Field of Classification Search
CPC .. A01K 5/0225; A01K 5/0233; A01K 5/0241; A01K 5/0275; A01K 5/0283; A01K 5/0291; A01K 5/00; A01K 5/02; B65D 88/68; B65G 65/4836
See application file for complete search history.

(56) References Cited

U.S. PATENT DOCUMENTS

| | | | | |
|---|---|---|---|---|
| 4,485,765 A * | 12/1984 | Schwartz | ............. | A01K 5/0291 119/51.13 |
| 4,513,688 A * | 4/1985 | Fassauer | .............. | A01K 5/0291 119/57.1 |
| 4,892,233 A * | 1/1990 | Zelickson | ............... | A47F 1/035 141/144 |
| 6,427,628 B1 * | 8/2002 | Reece | .................. | A01K 5/0291 119/51.11 |
| 6,789,503 B1 * | 9/2004 | Gao | ..................... | A01K 5/0291 119/51.11 |

* cited by examiner

*Primary Examiner* — Kristen C Hayes
(74) *Attorney, Agent, or Firm* — ZANIP

(57) ABSTRACT

The pet feeder composed of a shell, a fodder pot set on one side of the shell and a fodder vessel set inside the shell; a feed inlet is set on the top of the fodder vessel and the first outlet is set on the bottom thereof; a mounting base is also set inside the shell, a driving mechanism, a driving medium and a micro switch are set on the mounting base, the driving mechanism drives the driving medium to rotate, and the driving medium triggers the micro switch once after rotating at a certain angle; the driving medium is provided with the rotation shaft connected with and driven itself, and many even-distributed vanes are set on the rotation shaft; bolt-jointed blanking pot is set on the bottom of fodder vessel, the rotation shaft passes through the blanking pot, and many vanes divide the blanking pot into many blanking grooves.

10 Claims, 11 Drawing Sheets

PET FEEDER

FIELD OF THE INVENTION

The present invention relates to feeder technical field, more specifically relates to pet feeder.

BACKGROUND OF THE INVENTION

Pet feeder is a kind of new-type device for feeding the pet. Pet can also get food from the feeder when master is not at home.

Most pet feeders in existing technology have the following problems: 1. food is directly discharged and there is no quantitative. Insufficient food discharging will lead to that pet can't eat enough and excessive food discharging will lead to that pet eats too much; 2. Pet feeder has no any moisture-proof measure which leads to that pet food suffers moisture deterioration so as to affect pet health; 3. Food blocking is easy to appear and it leads to that pet suffers from hunger.

Thus, a kind of pet feeder is urgently needed to solve the deficiencies of existing technology.

SUMMARY OF THE INVENTION

To overcome the above shortcomings, the present invention provides a kind of pet feeder to solve the deficiencies of existing technology.

The technologies in the present invention are as follows:

The pet feeder includes a shell, a fodder pot set on one side of the shell and a fodder vessel set inside the shell; a feed inlet is set on the top of the fodder vessel and a first outlet is set on the bottom thereof; a mounting base is also set inside the shell, a driving mechanism, a driving medium and a micro switch are set on the mounting base; the driving mechanism drives the driving medium to rotate, and after rotating at a certain angle, the driving medium triggers the micro switch once; the driving medium is provide with a rotation shaft connected with and driven itself, and many even-distributed vanes are set on the rotation shaft; a bolt-jointed blanking pot is set on the bottom of the fodder vessel, the rotation shaft passes through the blanking pot, and many vanes divide the blanking pot into many blanking grooves; a second outlet is set on the bottom of the blanking pot, a blanking tube is also set inside the shell, and an infrared sensor is set on the blanking tube; fodder in the fodder vessel falls into the blanking groove through the first outlet, the rotation shaft moves the fodder in the blanking groove to the second outlet through the vanes, and the fodder falls into the fodder pot after entering the blanking tube through the second outlet.

Preferably, the driving medium is composed of a turbine, multiple trigger parts and a mounting cylinder. The trigger part is "V" shaped boss and many trigger parts are uniformly distributed on the top surface of the turbine along the edge of turbine. The action reed of the micro switch is offset with the trigger part; the mounting cylinder is set in the middle part of the turbine and a mounting hole is set on the mounting cylinder.

Preferably, the driving mechanism is composed of a motor, a first pulley, a second pulley and a worm; the motor is connected with the first pulley through a first belt; the first pulley is connected with the second pulley through a second belt, the worm is fixed to the central position of the second pulley, and the turbine engages with the worm.

Preferably, the root of the rotation shaft is pillar, the cross section of the pillar is cross-shaped, the pillar matches the mounting hole; a vane mounting cylinder is also set on the rotation shaft and many vanes are uniformly distributed on the side surface of the vane mounting cylinder; stirring blades are set on the head of the rotation shaft and the stirring blades stretch into the fodder vessel through the first outlet.

Preferably, the shell is composed of a front panel and a lower shell and an upper shell arranged in turn on one side of the front panel from the bottom to the top; the upper shell is rotationally connected with the lower shell; a mounting plate is set on the internal top surface of the upper shell, the mounting plate is provided with a pinboard sliding with it, and the side of the front panel is provided with a pin hole corresponding to the pinboard; the pinboard is provided with a push button, the upper shell is provided an avoiding hole corresponding to the push button.

Preferably, the fodder vessel is provided with a seal ring, which is arranged around the feed inlet; the bottom surface of the mounting plate is provided with a circular groove matching the seal ring.

Preferably, a containing cavity and a cover plate used for covering the containing cavity are set on the bottom surface of the mounting plate, and many through-holes are set on the cover plate; buckles are set on the side of cover plate and button holed corresponding to the buckle are set on the mounting plate.

Preferably, an infrared night vision camera used for shooting is set on the front panel; a feed button, a WIFI module and a MCU module used for controlling the driving mechanism are set inside the shell; a power interface used for power supply is set on the lower shell; the feed button, the WIFI module, the infrared night vision camera, the driving mechanism and the infrared sensor are all electrically connected with the MCU module.

Preferably, the bottom of the fodder vessel is also provided with a blocking Block Preferably, the vanes have the same number as the trigger parts and corresponds to one by one.

Beneficial effects of the present invention are as follows.

1. Multiple of the vanes divide the blanking pot into multiple of the blanking grooves with the same volume and the blanking grooves play a role of quantitative role; in the process of food discharging, the fodder in the fodder vessel falls into the blanking grooves through the first outlet, the rotation shaft moves the fodder in the blanking grooves to the second outlet through the vanes during rotation, and the fodder falls into the fodder pot after entering the fodder tube through the second outlet; when an amount of fodder in a blanking groove falls into the fodder pot, it's regarded as a serving size of fodder; at the same time, the trigger parts trigger the micro switch and the driving mechanism stop working to complete one food discharging; thus, the pet feeder is capable of quantitative food discharging.

2. The containing cavity and the cover plate used for covering the containing cavity are set on the bottom surface of mounting plate and multiple of the through-holes are set on the cover plate; the buckles are set on the board side of the cover plate and multiple of the button holes corresponding to the buckles are set on the mounting plate. In use, the dryer packages are put inside the containing cavity and the cover plate is used to cover the containing cavity, and the dryer package plays a role of moisture absorption through through-holes; the seal ring is set on the fodder vessel and it's arranged around the inlet; the circular groove matching the seal ring is set on the bottom surface of the mounting plate; the seal ring is embedded in the circular groove to play a role of sealing to further improve the moisture-proof effect.

3. The blocking block is also set on the bottom of fodder vessel and it's made of soft rubber. The blocking block has many bar-shaped pieces and it sweeps the fodder into blanking groove to play a role of anti-blocking.

DETAILED DESCRIPTION OF ILLUSTRATED EMBODIMENTS

Figure 1:
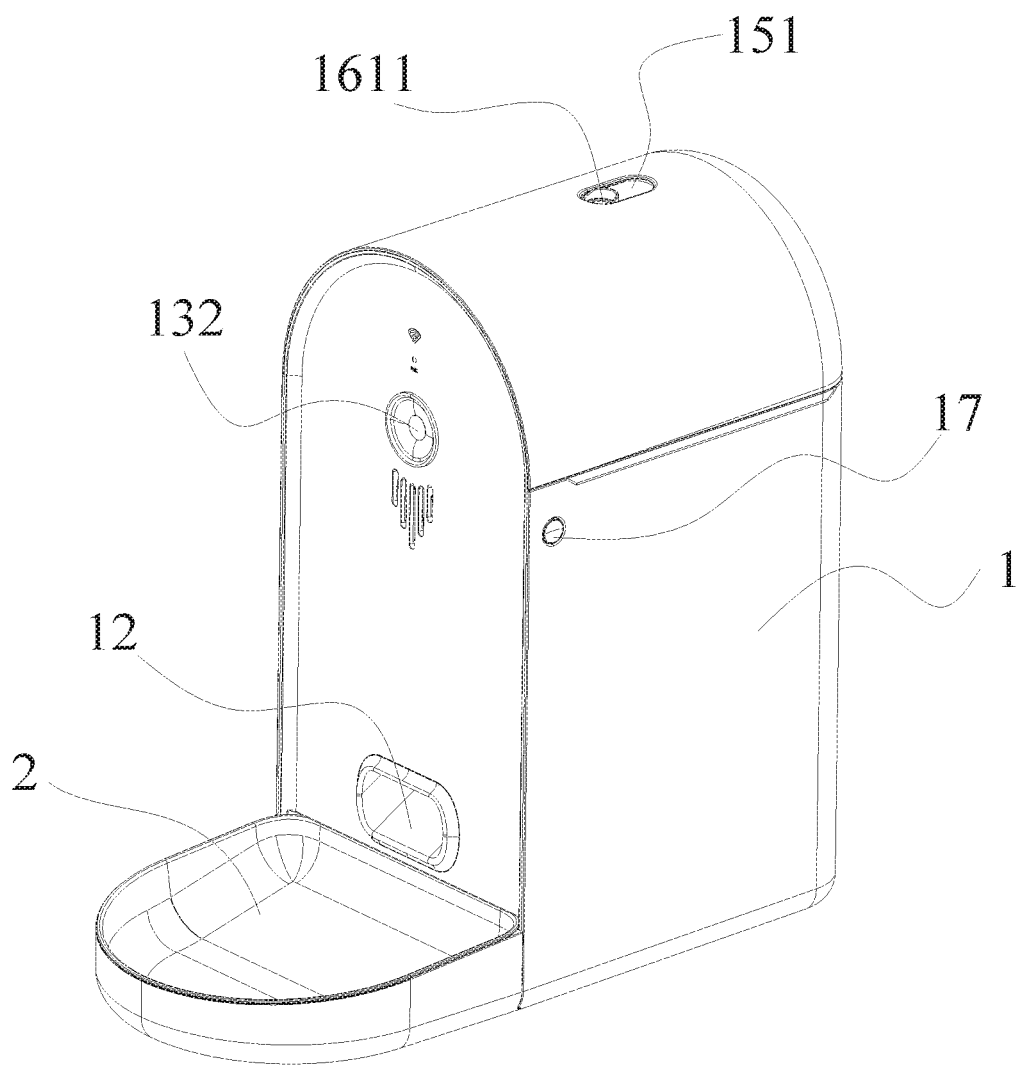
FIG. 1 is the stereoscopic diagram of the pet feeder in the present invention.

The further explanation is made as follows in combination with the embodiments, which are the preferable embodiments in the present invention.

Referring to FIG. 1-14, the pet feeder is composed of shell 1, a fodder pot 2 set on one side of the shell 1 and a fodder vessel 3 set inside the shell 1. The top of the fodder vessel 3 is provided with a feed inlet 31 and the bottom of thereof is provided with a first outlet 32. A mounting base 11 is also set inside the shell 1, a driving mechanism 4, a driving medium 5 and a micro switch 6 are set on the mounting base 11. The driving mechanism 4 drives the driving medium 5 to rotate, and the driving medium 5 triggers the micro switch 6 once after rotating at a certain angle. The driving medium 5 is provided with a rotation shaft 7 connected with and driven itself, Many even-distributed vanes 71 are set on the rotation shaft 7; A bolt-jointed blanking pot 8 is set on the bottom of fodder vessel 3. The rotation shaft 7 passes through blanking pot 8, and the vanes 71 divide the blanking pot 8 into multiple of blanking grooves 81 with the same volume; the second outlet 82 is set on the bottom of blanking pot 8, the blanking tube 12 is also set inside the shell 1, and the blanking tube 12 is provided with an infrared sensor 121, used to check the feed through the blanking tube 12. When the pet feeder works, the fodder in the fodder vessel 3 falls into the blanking groove 81 through the first outlet 32, the driving mechanism 4 drives the rotation shaft 7 to rotate through the driving medium 5, the rotation shaft 7 moves the fodder in the blanking groove 81 to the second outlet 82 through the vanes 71, and the fodder falls into fodder pot 2 after entering the blanking tube 12 through the second outlet 82.

Figure 6:
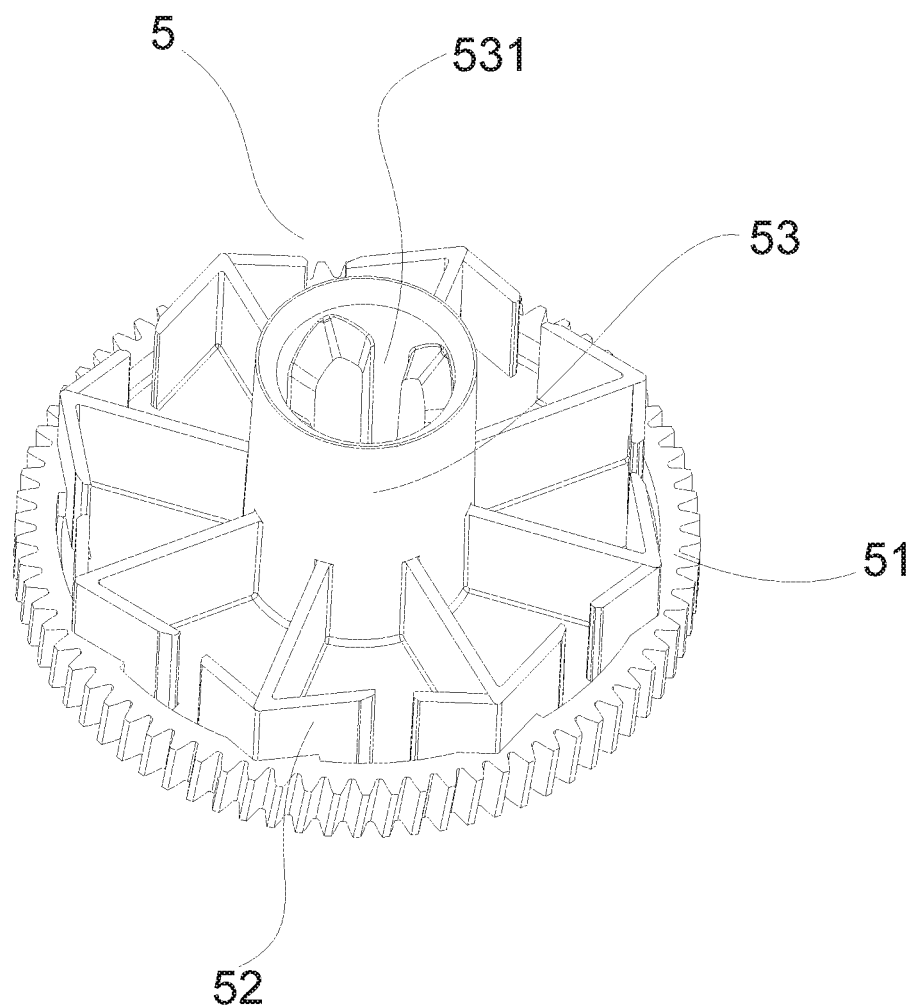
FIG. 6 is the structure diagram of the driving medium in the present invention.

Referring to FIG. 6, the driving medium 5 is composed of a turbine 51, multiple trigger parts 52 and a mounting cylinder 53. The trigger part 52 is "V" shaped boss and multiple of the trigger parts 52 are uniformly distributed on the top surface of the turbine 51 along the edge of the turbine 51. The action reed of the micro switch 6 is offset with the trigger part 52; the mounting cylinder 53 is set in the middle part of the turbine 51 and a mounting hole 531 is set on the mounting cylinder 53. When the driving mechanism 4 drives the driving medium 5 to rotate at a certain angle, the trigger part 52 will press the action reed and trigger the micro switch 6.

Figure 5:
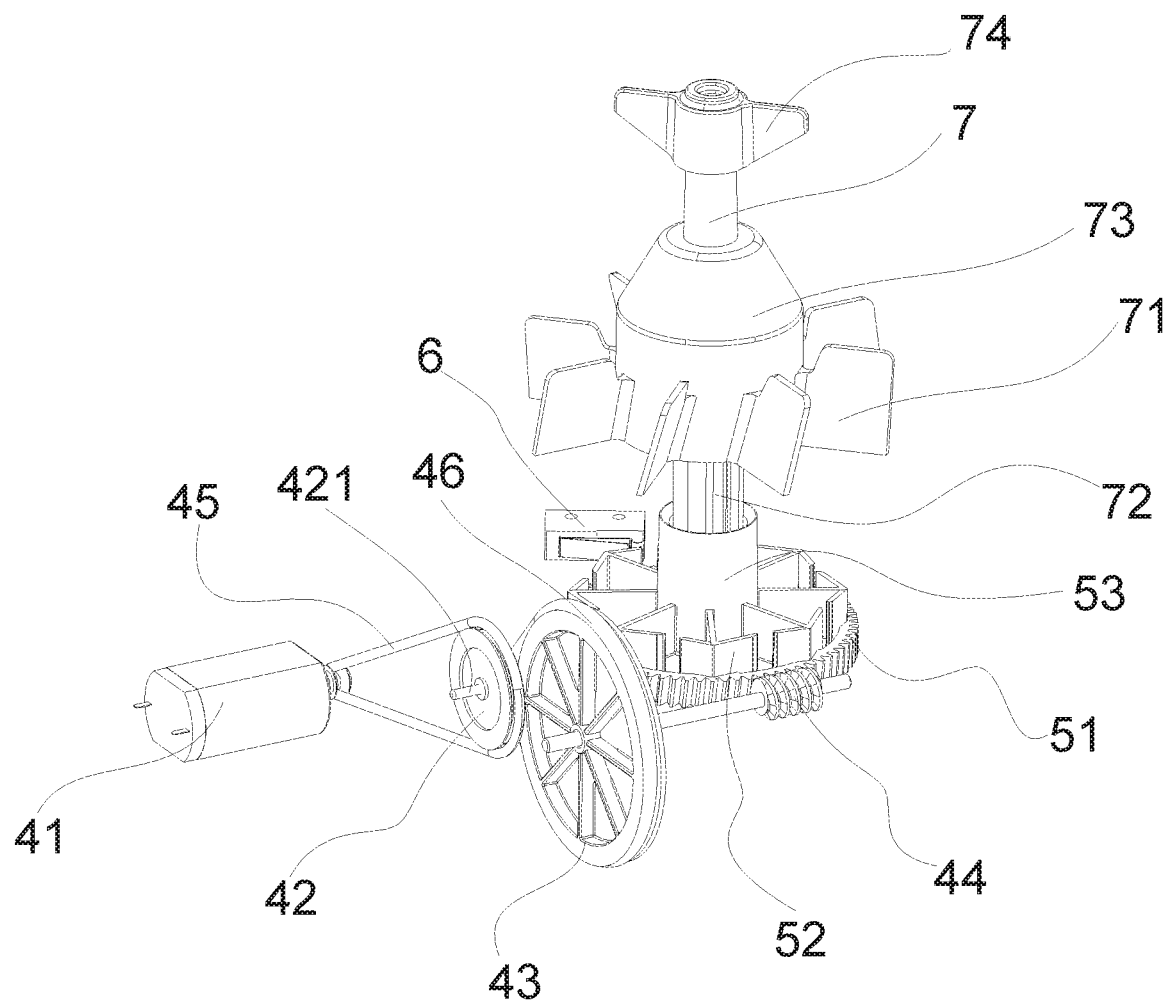
FIG. 5 is the assembly diagram of the driving mechanism, the driving medium and the rotation shaft in the present invention.

Referring to FIG. 5, the driving mechanism 4 is composed of motor 41, a first pulley 42, a second pulley 43 and a worm 44; the motor 41 is connected with the first pulley 42 through a first belt 45; the first pulley 42 is connected with the second pulley 43 through a second belt 46, the worm 44 is fixed to the central position of the second pulley 43, and the turbine 41 engages with the worm 44.

The working principle of the driving mechanism 4 is as follows. When the motor 41 works, its output shaft drives the first pulley 42 to rotate through the first belt 45, a transmission shaft 421 is set on center position of the first pulley 42, the transmission shaft 421 drives the second pulley 43 to rotate through the second belt 46, further, the diameter of the second pulley 43 is larger than that of the first pulley 42 for the role of deceleration. The second pulley 43 drives the turbine 51 to rotate through the worm 44.

Figure 7:
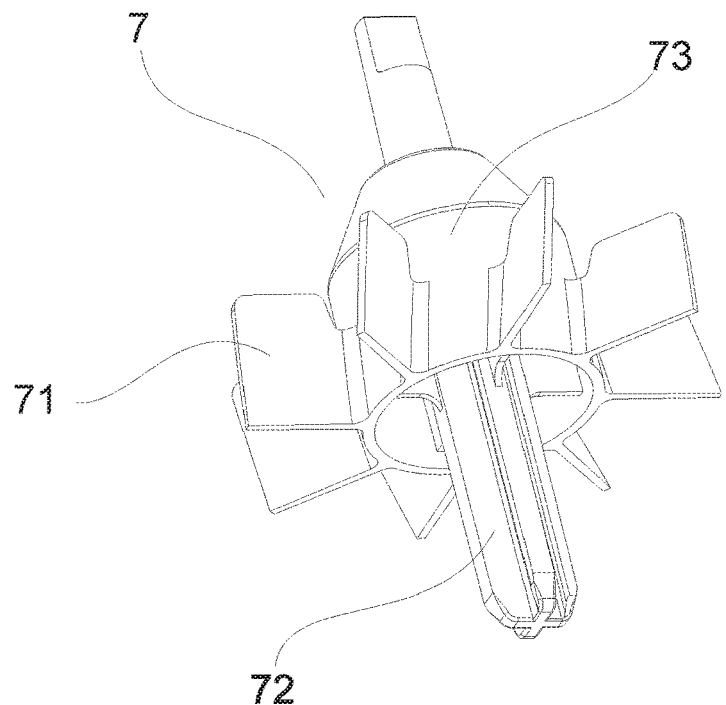
FIG. 7 is the structure diagram of the rotation shaft in the present invention.
Figure 8:
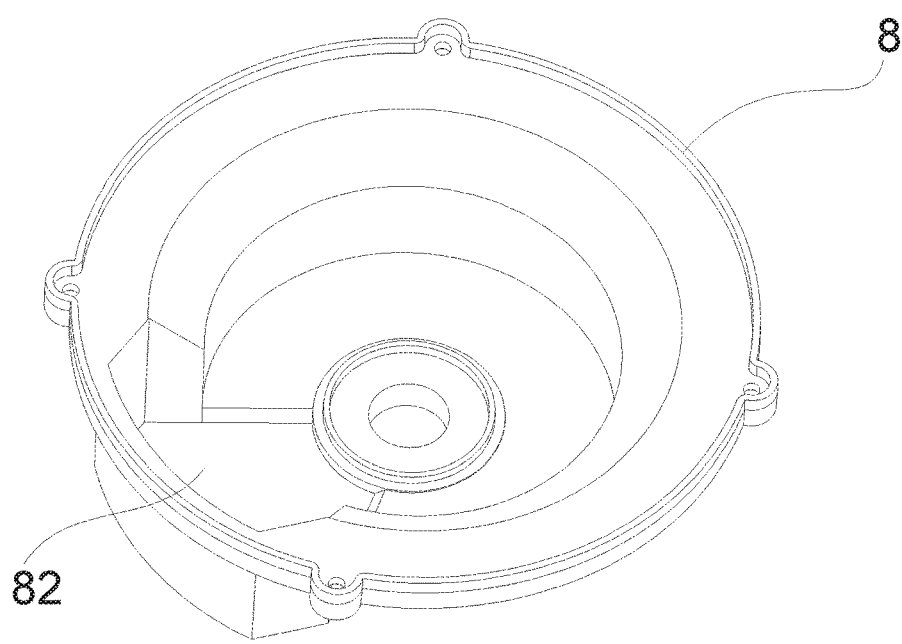
FIG. 8 is the structure diagram of the blanking pot in the present invention.

Referring to FIG. 7, the root of the rotation shaft 7 is pillar 72, the cross section of the pillar 72 is cross-shaped, the pillar 72 matches the mounting hole 531, and the pillar 72 is inserted into the mounting hole 531. A vane mounting cylinder 73 is also set on the rotation shaft 7 and the vanes 51 are uniformly distributed on the side surface of the vane mounting cylinder 73; a stirring blade 74 is set on the head of the rotation shaft 7 and the stirring blade 74 stretches into the fodder vessel 3 through the first outlet 32. The rotation shaft 7 and the blanking pot 8 are replaceable because volume of the blanking groove 81 and size of the vanes 71 are correspondent with internal size of the blanking pot 8, and the amount of food discharging is correspondent with volume of the blanking groove 81. Thus, user replaces the rotation shaft 7 with the vanes 71 in different sizes and the vanes 71 matched the blanking pot 8 so as to achieve the goal of adjusting the amount of food discharging.

Figure 2:
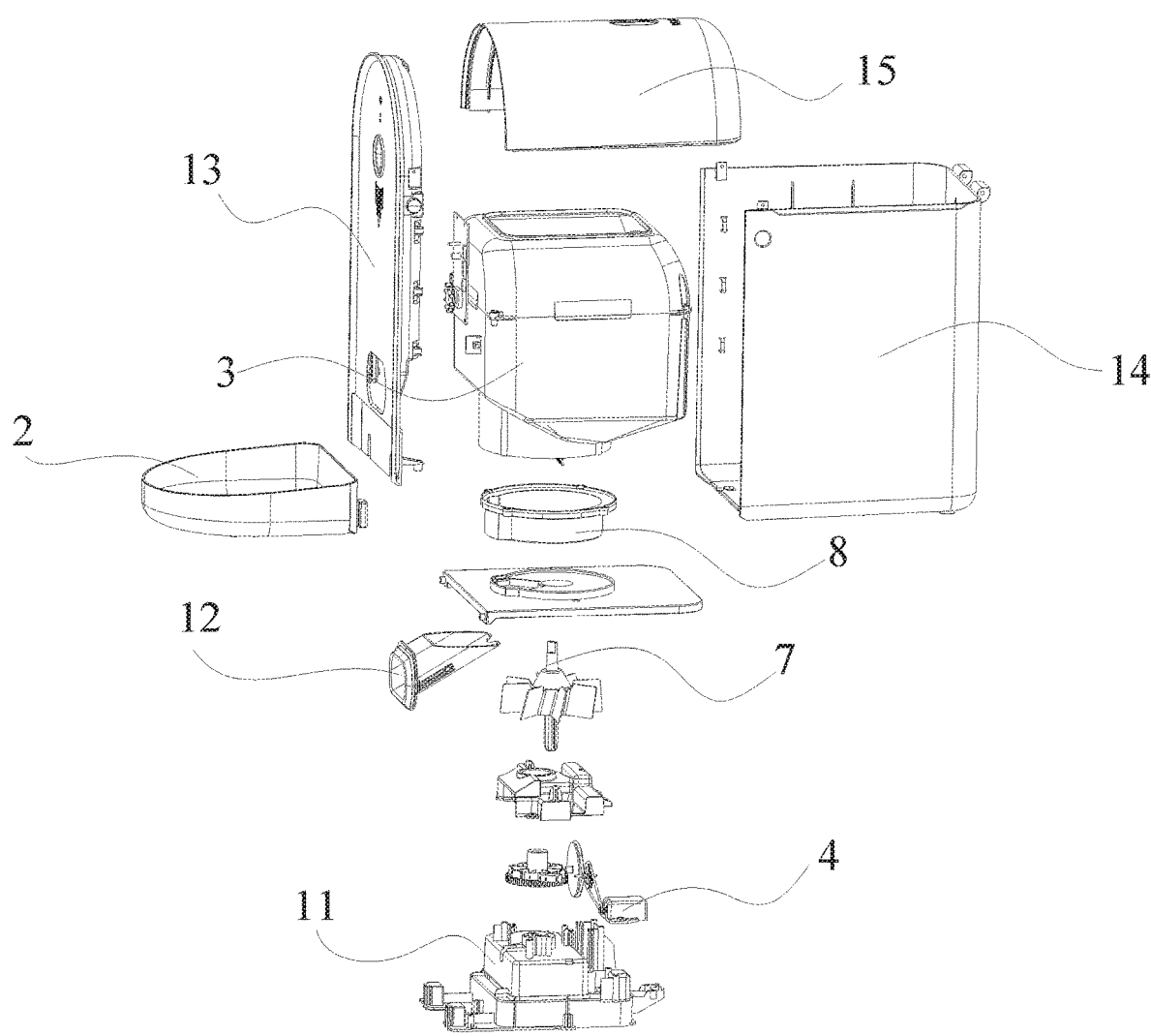
FIG. 2 is the explosive diagram of the pet feeder in the present invention.
Figure 3:
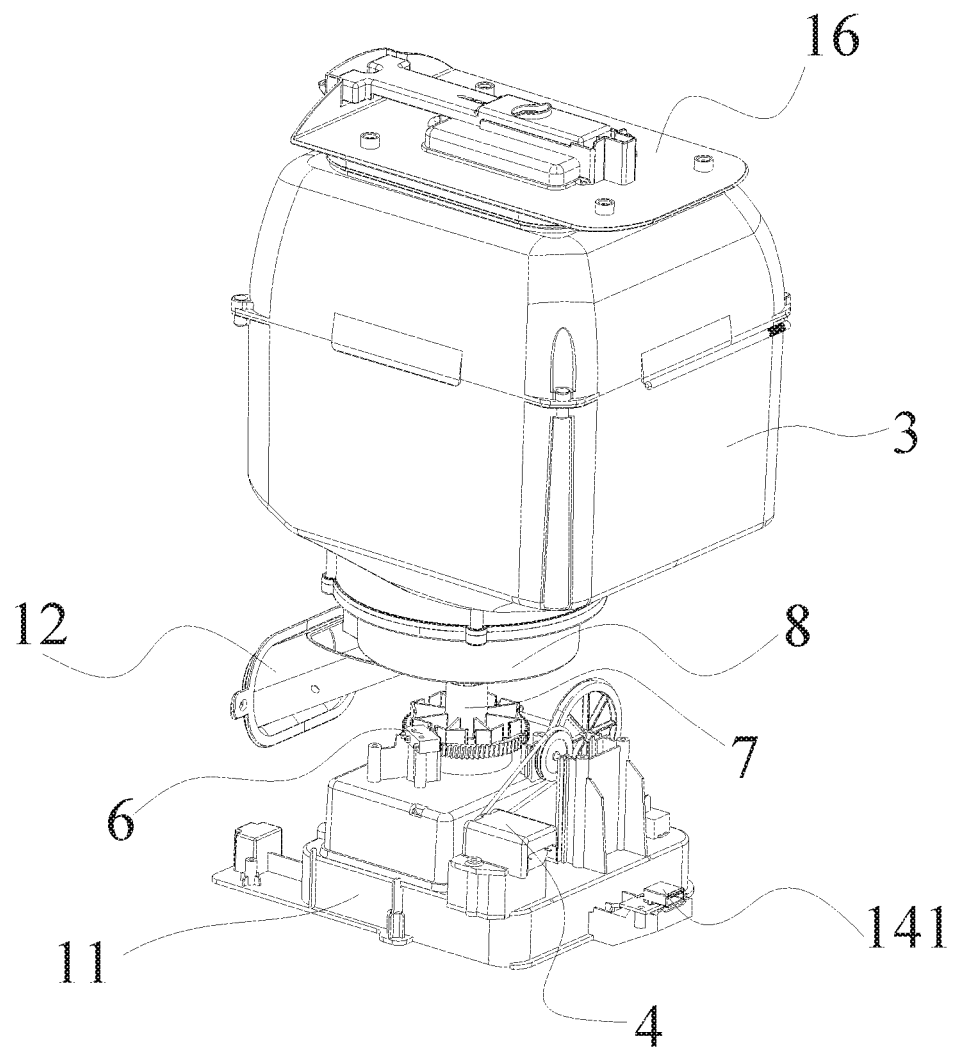
FIG. 3 is the structure diagram of the pet feeder in the present invention.
Figure 4:
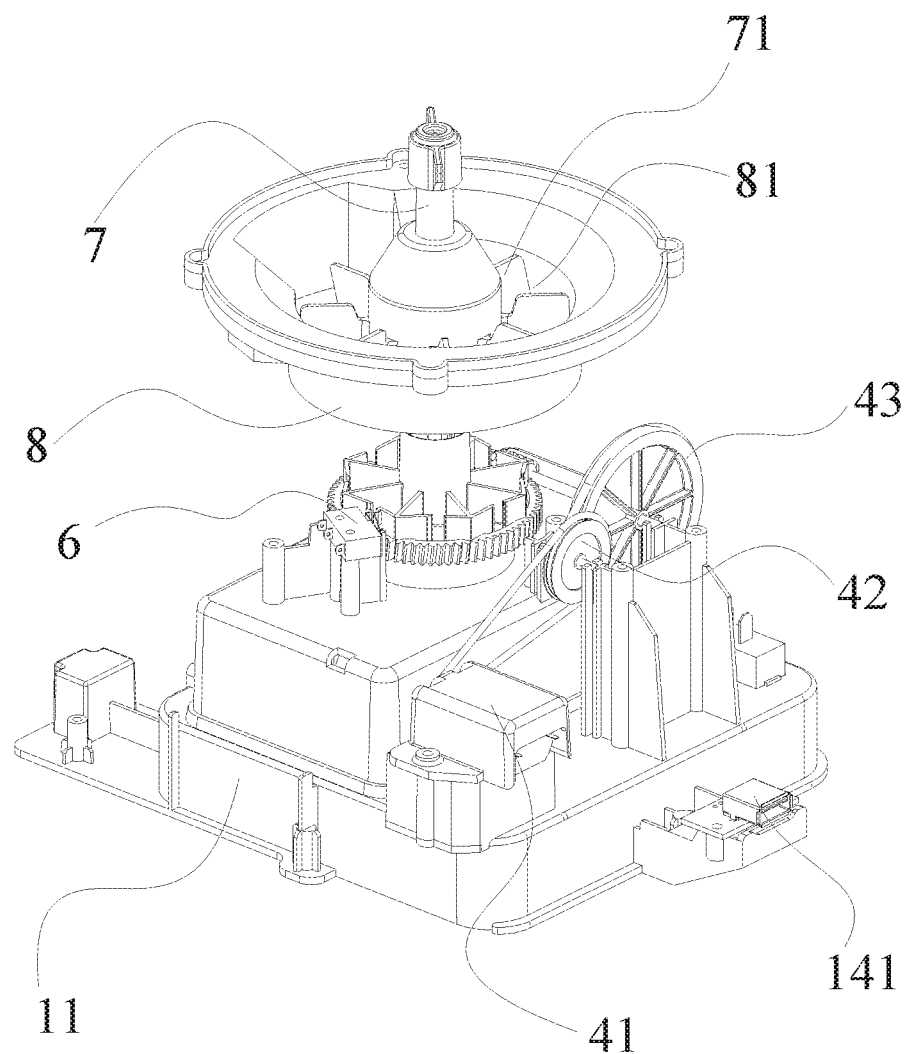
FIG. 4 is the assembly diagram of the driving mechanism, the driving medium, the rotation shaft and the blanking pot in the present invention.
Figure 11:
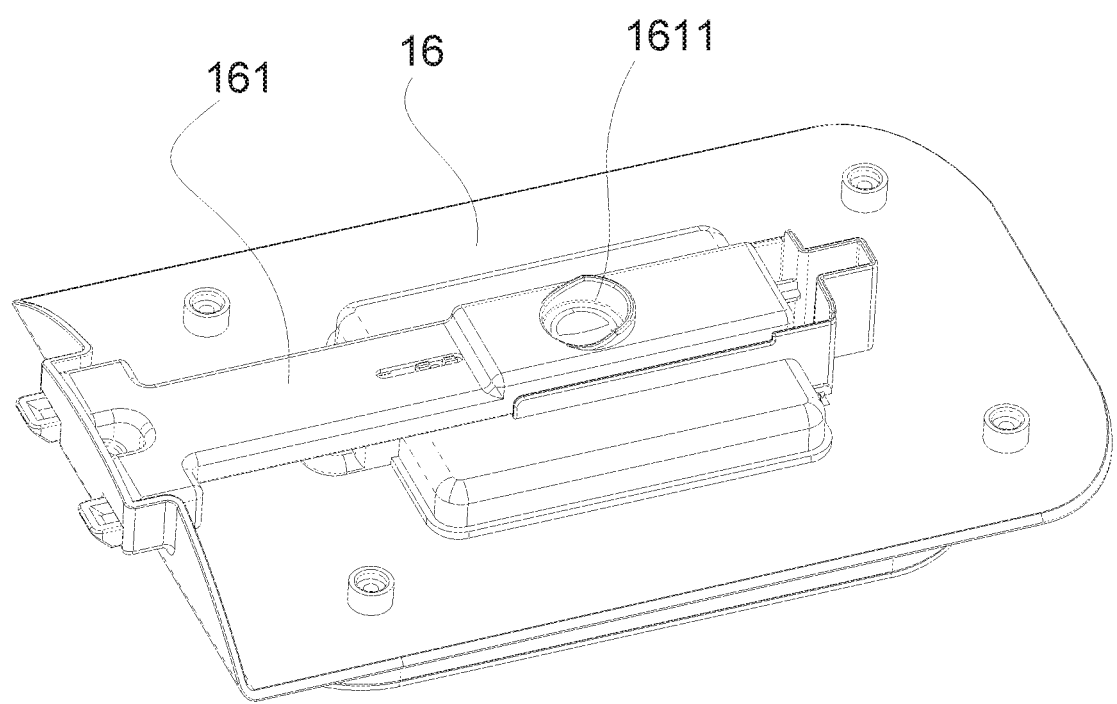
FIG. 11 is the structure diagram of the mounting plate in the present invention.

Referring to FIG. 1, FIG. 2 and FIG. 11, the shell 1 is composed of a front panel 13 and a lower shell 14 and an upper shell 15 arranged in turn on one side of the front panel 13 from the bottom to the top. Specifically, the lower shell 14 is screw jointed on the internal side surface of the front panel 13. The upper shell 15 is rotationally connected with the lower shell 14 through a rotation shaft. The mounting plate 16 is set on the internal top surface of the upper shell 15, the mounting plate 16 is provided with a pinboard 161 sliding with it, and the side of the front panel 13 is provided with a pin hole 1310 corresponding to the pinboard 161; the pinboard 161 is provided with a push button 1611, the upper shell 15 is provided an avoiding hole 151 corresponding to the push button 1611.

Figure 9:
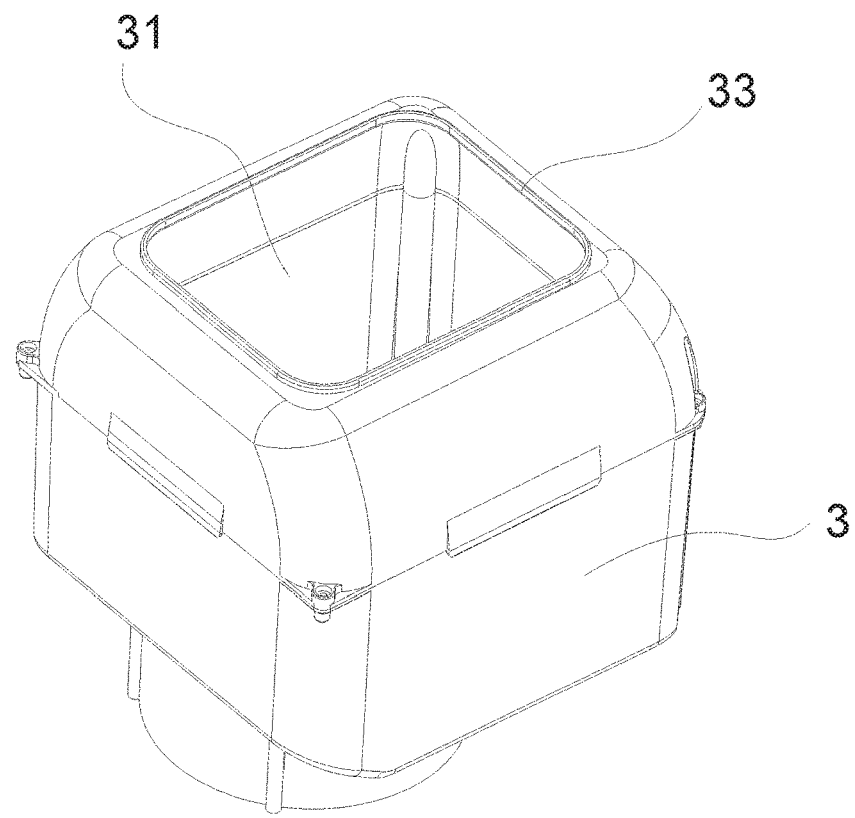
FIG. 9 is the structure diagram of the fodder vessel in the present invention.

Referring to FIG. 9, a seal ring 33 is set on the fodder vessel 3 and it's arranged around the inlet 31; a circular groove 162 matching the seal ring 33 is set on the bottom surface of the mounting plate 16. When the upper shell 15 and the lower shell 14 are covered, the seal ring 33 is inserted in the circular groove 162 to play a role of sealing to prevent external water vapor from entering the fodder vessel 3.

Figure 12:
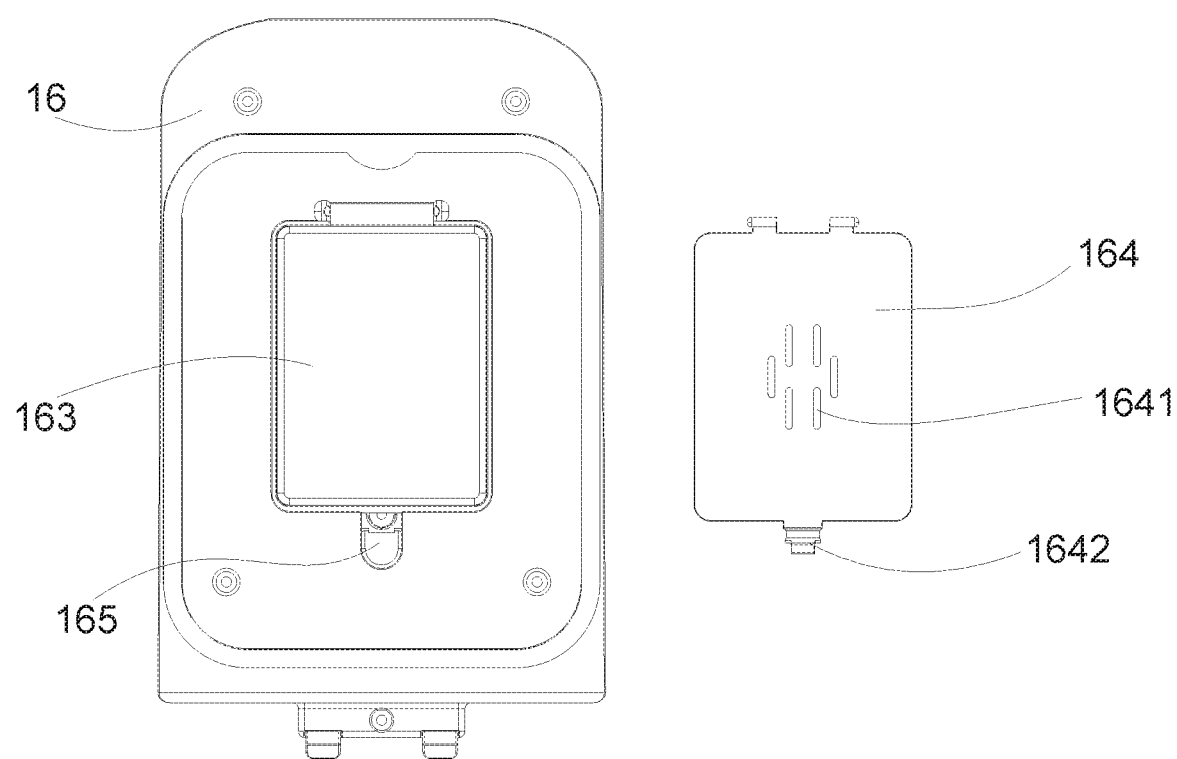
FIG. 12 is another structure diagram of the mounting plate in the present invention.
Figure 13:
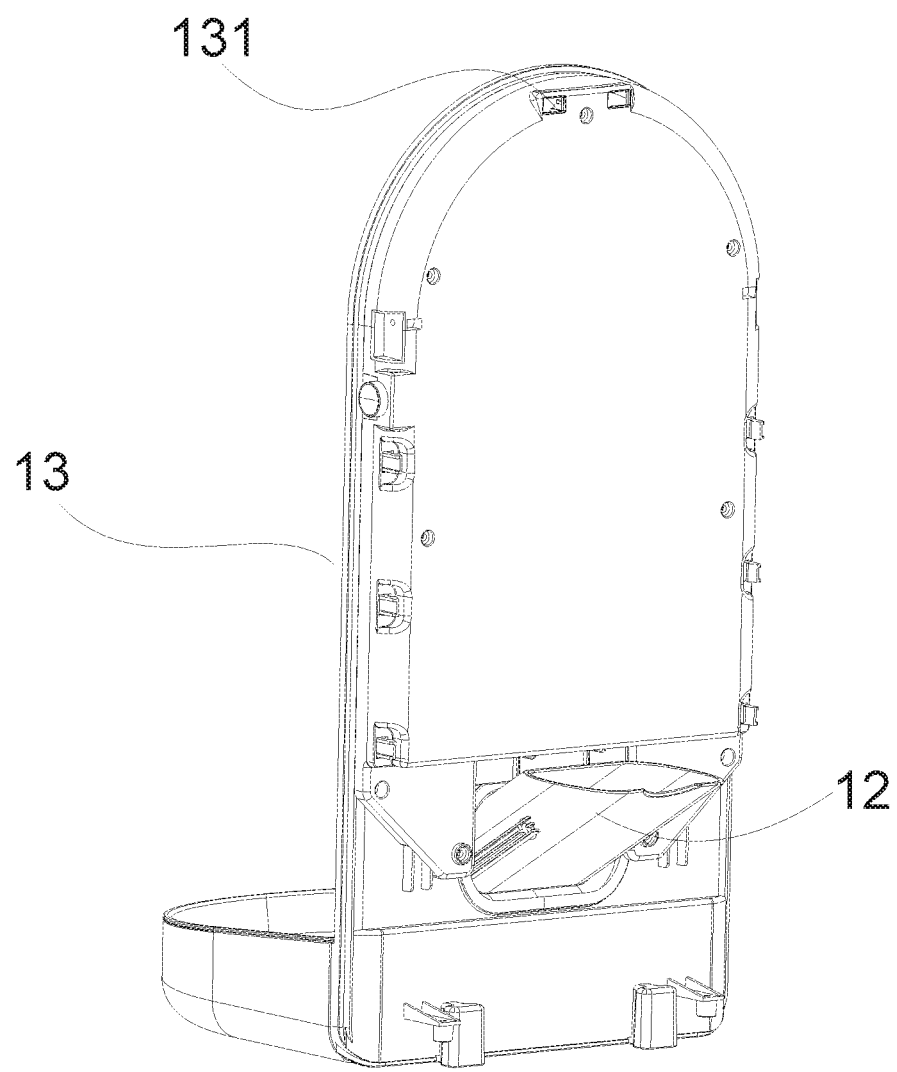
FIG. 13 is the structure diagram of the front panel in the present invention.

Referring to FIG. 12, a containing cavity 163 and a cover plate 164 used for covering the containing cavity 163 are set on the bottom surface of the mounting plate 16, and many through-holes 1641 are set on the cover plate 164; buckles 1642 are set on the board side of the cover plate 164 and buttonholes 165 corresponding to the buckles 1642 are set on the mounting plate 16. The containing cavity 163 is used for preventing dryer package. In use, the dryer package is put in the containing cavity 163, the cover plate 164 is used, and the buckle 1642 and the buttonhole 165 are clamped. The dryer package absorbs water vapor in the fodder vessel 3 through the through-holes 1641 to play a role of moisture protection.

Figure 14:
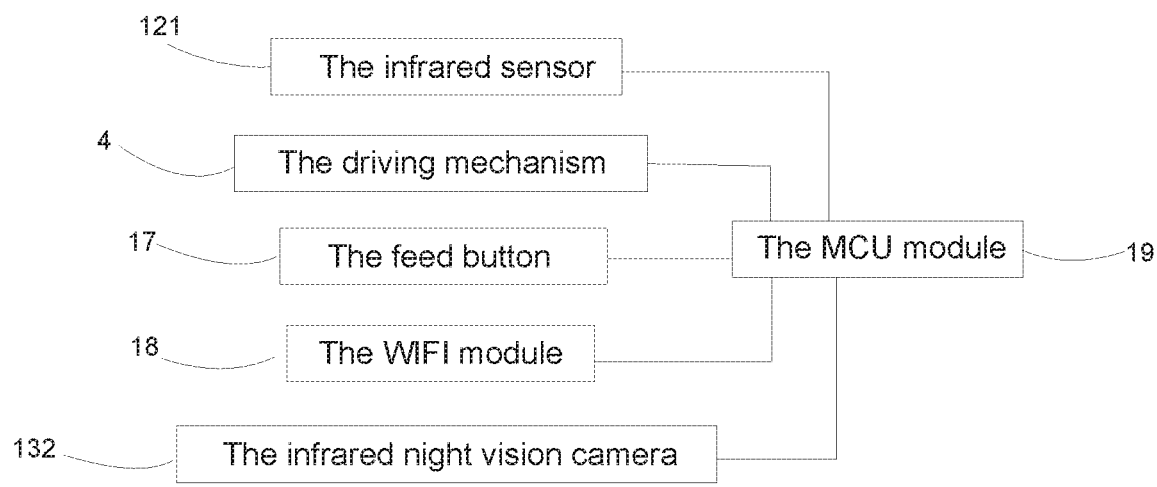
FIG. 14 is the structure diagram of the feed button, the WIFI module, the infrared night vision camera, the driving mechanism, the infrared sensor and the MCU module in the present invention.

Referring to FIG. 1 and FIG. 14, an infrared night vision camera 132 used for shooting is set on the front panel 13; a feed button 17, a WIFI module 18 and a MCU module 19 used for controlling the driving mechanism are set inside the shell 1; a power interface 141 used for power supply is set on the lower shell 14; the feed button 17, the WIFI module 18, the infrared night vision camera 132, the driving mechanism 4 and the infrared sensor 121 are all electrically connected with the MCU module 19. User presses the feed button 17 to activate the driving mechanism 4 to feed pet. User can also connect WIFI module 18 through a mobile device, output an instruction to MCU module 19 through the APP on the mobile device, and the MCU module 19 controls operation of the driving mechanism 4 to feed pet. The infrared night vision camera 132 provides video monitoring function and the infrared night vision camera 132 is used for monitoring pet's status and conveys video information to user's device through the WIFI module 18.

Figure 10:
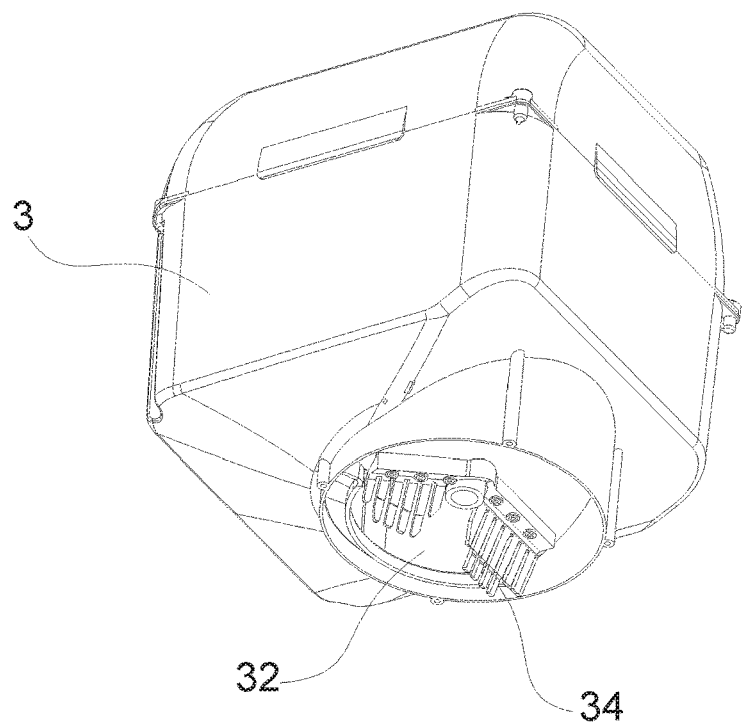
FIG. 10 is another structure diagram of the fodder vessel in the present invention.

Referring to FIG. 10, the bottom of the fodder vessel 3 is also provided with a blocking block 34 screw jointing with itself. The blocking block 34 is composed of many adhesive tapes arranged along the straight line and the adhesive tapes are made of soft rubber. The blocking block 34 sweeps the fodder into blanking groove 81 to play a role of anti-blocking. Referring to FIG. 5, the vane 51 and the trigger part 52 have the same number as the trigger parts and corresponds to one by one.

The working principle of the pet feeder is as follows. The driving mechanism 4 starts and drives the rotation shaft 7 to rotate through driving medium 5, and when the rotation shaft 7 rotates, the vanes 71 move the fodder in the blanking groove 81 to the second outlet 82 and the fodder falls into the feed pot 2 after entering blanking tube 12. when an amount of fodder in a blanking groove 81 falls into the fodder pot 2, it's regarded as a serving size of fodder. At the same time, trigger parts 52 trigger the micro switch 6 and driving mechanism 4 stop working to complete one food discharging. Thus, the pet feeder is capable of quantitative food discharging.

Beneficial effects of the present invention are as follows.

1. Multiple of the vanes divide the blanking pot into multiple of the blanking grooves with the same volume and the blanking grooves play a role of quantitative role; in the process of food discharging, the fodder in the fodder vessel falls into the blanking grooves through the first outlet, the rotation shaft moves the fodder in the blanking grooves to the second outlet through the vanes during rotation, and the fodder falls into the fodder pot after entering the fodder tube through the second outlet; when an amount of fodder in a blanking groove falls into the fodder pot, it's regarded as a serving size of fodder; at the same time, the trigger parts trigger the micro switch and the driving mechanism stop working to complete one food discharging; thus, the pet feeder is capable of quantitative food discharging.

2. The containing cavity and the cover plate used for covering the containing cavity are set on the bottom surface of mounting plate and multiple of the through-holes are set on the cover plate; the buckles are set on the board side of the cover plate and multiple of the button holes corresponding to the buckles are set on the mounting plate. In use, the dryer packages are put inside the containing cavity and the cover plate is used to cover the containing cavity, and the dryer package plays a role of moisture absorption through through-holes; the seal ring is set on the fodder vessel and it's arranged around the inlet; the circular groove matching the seal ring is set on the bottom surface of the mounting plate; the seal ring is embedded in the circular groove to play a role of sealing to further improve the moisture-proof effect.

3. The blocking block is also set on the bottom of fodder vessel and it's made of soft rubber. The blocking block has many bar-shaped pieces and it sweeps the fodder into blanking groove to play a role of anti-blocking.

While the specification has described in detail certain exemplary embodiments, it will be appreciated that those skilled in the art, upon attaining an understanding of the foregoing, may readily conceive of alterations to, variations of, and equivalents to these embodiments. The foregoing preferred embodiments of the present invention are illustrated of the present invention rather than limiting of the present invention. It is intended to cover various modifications and changes included within the spirit and scope of the appended claims, the scope of which should be accorded the broadest interpretation so as to encompass all such modifications and similar structures.

What is claimed is:

1. A pet feeder includes a shell, a fodder pot set on one side of said shell and a fodder vessel set inside said shell; a feed inlet is set on the top of said fodder vessel and a first outlet is set on the bottom thereof; wherein a mounting base is also set inside said shell, a driving mechanism, a driving medium and a micro switch are set on said mounting base; said driving mechanism drives said driving medium to rotate, and after rotating at a certain angle, said driving medium triggers said micro switch once; said driving medium is provided with a rotation shaft connected with and driven itself, and many even-distributed vanes are set on said rotation shaft; bolt-jointed blanking pot is set on said bottom of the fodder vessel, said rotation shaft passes through said blanking pot, and many vanes divide said blanking pot into many blanking grooves; a second outlet is set on the bottom of said blanking pot, a blanking tube is also set inside said shell, and an infrared sensor is set on said blanking tube; fodder in said fodder vessel falls into said blanking groove through said first outlet, said rotation shaft moves said fodder in said blanking groove to said second outlet through said vanes, and said fodder falls into said fodder pot after entering said blanking tube through said second outlet.

2. The pet feeder according to claim 1, wherein said driving medium is composed of a turbine, multiple trigger parts and a mounting cylinder; said trigger part is "V"

shaped boss and many trigger parts are uniformly distributed on the top surface of said turbine along the edge of said turbine; the action reed of said micro switch is offset with said trigger part; said mounting cylinder is set in the middle part of said turbine and a mounting hole is set on said mounting cylinder.

3. The pet feeder according to claim 2, wherein said driving mechanism is composed of a motor, a first pulley, a second pulley and a worm; said motor is connected with said first pulley through a first belt; said first pulley is connected with said second pulley through a second belt, said worm is fixed to the central position of said second pulley, and said turbine engages with said worm.

4. The pet feeder according to claim 2, wherein the root of said rotation shaft is pillar, the cross section of said pillar is cross-shaped, said pillar matches said mounting hole; a vane mounting cylinder is also set on said rotation shaft and many vanes are uniformly distributed on the side surface of said vane mounting cylinder; stirring blades are set on the head of said rotation shaft and said stirring blades stretch into said fodder vessel through the first outlet.

5. The pet feeder according to claim 1, wherein said shell is composed of a front panel and a lower shell and an upper shell arranged in turn on one side of said front panel from its bottom to its top; said upper shell is rotationally connected with said lower shell; a mounting plate is set on the internal top surface of said upper shell, said mounting plate is provided with a pinboard sliding with it, and the side of said front panel is provided with a pin hole corresponding to said pinboard; said pinboard is provided with a push button, said upper shell is provided an avoiding hole corresponding to said push button.

6. The pet feeder according to claim 5, wherein said fodder vessel is provided with a seal ring, which is arranged around said feed inlet; the bottom surface of said mounting plate is provided with a circular groove matching said seal ring.

7. The pet feeder according to claim 5, wherein a containing cavity and a cover plate used for covering said containing cavity are set on the bottom surface of said mounting plate, and many through-holes are set on said cover plate; buckles are set on the side of said cover plate and button holed corresponding to said buckle are set on said mounting plate.

8. The pet feeder according to claim 5, wherein an infrared night vision camera used for shooting is set on said front panel; a feed button, a WIFI module and a MCU module used for controlling said driving mechanism are set inside said shell; a power interface used for power supply is set on said lower shell; said feed button, said WIFI module, said infrared night vision camera, said driving mechanism and said infrared sensor are all electrically connected with said MCU module.

9. The pet feeder according to claim 1, wherein said bottom of said fodder vessel is also provided with a blocking Block.

10. The pet feeder according to claim 1, wherein said vanes have the same number as said trigger parts and corresponds to one by one.

* * * * *